R. T. BELL.
ADVERTISING DEVICE.
APPLICATION FILED FEB. 25, 1920.
1,379,329.
Patented May 24, 1921.
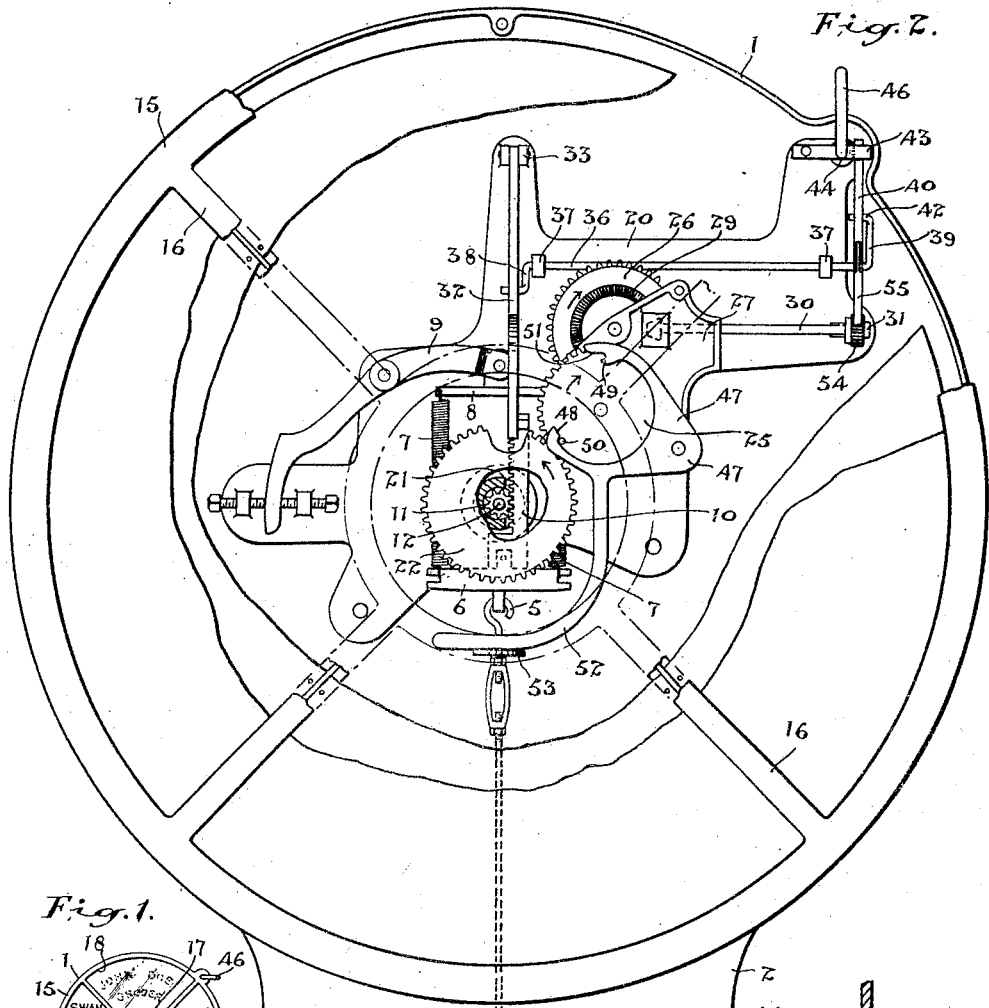
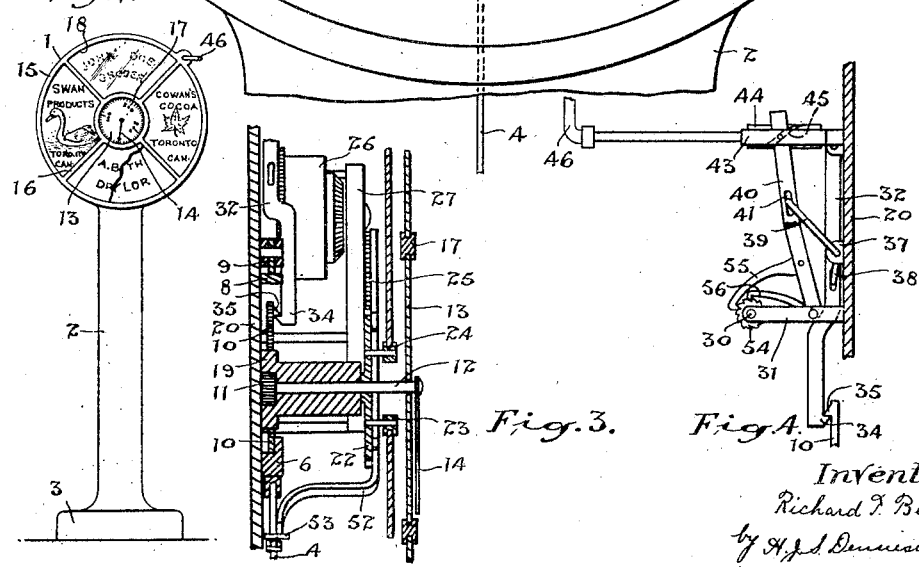
Inventor.
Richard T. Bell
by H. J. S. Dennison atty.

UNITED STATES PATENT OFFICE.

RICHARD THOMAS BELL, OF TORONTO, ONTARIO, CANADA, ASSIGNOR OF ONE-FOURTH TO ROBERT J. COPELAND, OF TORONTO, CANADA.

ADVERTISING DEVICE.

1,379,329.     Specification of Letters Patent.     Patented May 24, 1921.

Application filed February 25, 1920. Serial No. 361,148.

*To all whom it may concern:*

Be it known that I, RICHARD THOMAS BELL, a subject of the King of Great Britain, and resident of the city of Toronto, county of York, Province of Ontario, in the Dominion of Canada, have invented certain new and useful Improvements in Advertising Devices, as described in the following specification and illustrated in the accompanying drawings, that form part of the same.

The invention relates to advertising devices applied to weighing scales particularly of the type which are placed in public places so that persons may ascertain their weight by standing upon a platform and their weight is indicated upon a dial and the principal objects of this invention are to utilize the mechanical operation of the scale mechanism to effect a change of the advertising display and thus provide an attractive means for directing attention to the advertising matter, and to so operate the display mechanism as to show several displays each time the scale is used.

A further and important object is to devise a mechanism which will be of very simple construction and will not be liable to get out of order and will operate indefinitely.

A still further object is to devise a structure which will not be operable by small children so that it will not become a plaything and suffer from abuse.

The principal feature of the invention consists in the novel construction and arrangement of parts whereby the movement of the scale beam effects the actuation of a rotatable display carrying member to change the display exposed through an opening in a casing arranged in front of the person using the scale and whereby the movement of the display mechanism is governed by means actuated by the movement of the scale beam.

A further important feature consists in the novel means of locking the scale and utilizing such locking means for effecting the operation of the display operating mechanism.

In the drawings, Figure 1 is a small front elevational view of a display scale constructed in accord with this invention.

Fig. 2 is an enlarged elevational and part sectional view of the display casing and the operating mechanism.

Fig. 3 is a vertical sectional detail taken through the axis of the scale indicator finger spindle.

Fig. 4 is a side elevational detail of the locking mechanism.

Advertising displays are valuable from certain definite peculiarities, first in the attractiveness of the display through general surroundings, second in the amount of effective space presented, and third in the element of surprise and variety and it is the purpose of this invention to combine all these features in a small space and in such a way as to be brought very actively to the notice of the public.

The medium which I have here shown for applying my invention is a weighing scale of the dial type which is a very common but an attractive form of scale used by persons to ascertain their weight. Fig. 1 shows a front elevational view on a small scale of such a device, a portion of one of the outer display spaces being broken away disclosing the movable display member thereunderneath.

The head of the machine is in the form of a circular casing 1 which is supported on a column 2 extending upwardly from the base 3 in which the scale platform is supported. The weighing mechanism herein shown is of a common form comprising the rod or steelyard 4 which extends up through the column from the scale platform and at the top is provided with an adjustable hook 5 which is connected to a cross bar 6, said cross bar being suspended by a pair of spiral springs 7. The springs 7 are supported from a cross bar 8 at the top which is pivotally supported centrally by an adjustable lever 9.

A rack bar 10 is secured to the lower cross bar 6 and meshes with the pinion 11 secured upon a spindle 12 which extends outwardly through the scale dial 13 carrying an indicating finger 14 on the end thereof.

The mechanism thus described constitutes the weighing apparatus.

The front face of the casing 1 is inclosed by a frame 15 which is divided into a plurality of sectors separated by the radial arms 16 extending outwardly from the central circular portion 17 surrounding the scale dial.

The upper sector 18 is provided with a transparent glass and the other sectors have arranged therein suitable advertising displays which are preferably glass covered.

The spindle 12 is journaled in a cylindrical member 19 rigidly secured to the back plate 20, the pinion 11 being housed in a recess in said member and the rack 10 operates in a slot 21 in said member.

A spur gear 22 is rotatably mounted on the spindle at the outer end of the member 19 and a circular frame 23 is supported from the said gear, being mounted upon pins 24 extending horizontally outward from said gear. This frame is divided into sectors corresponding with the sectors of the frame 15 and suitable displays are placed in these sectors, one of which will show through the transparent glass of the upper sector while the remainder are hidden behind the outer and fixed displays.

The gear 22 is operated by a spur gear 25, being the last of a train of gears operated by a spring motor 26 mounted between the back plate 20 and a plate 27. A winding gear 29 in the form of a bevel gear is secured to the casing 26 of the motor and a bevel pinion meshing with the gear 29 is carried on a shaft 30, which shaft is supported in a bearing in the plate 27 and in a bracket 31 secured to the back plate 20.

The scale platform is locked by a latch arm 32 pivoted at its upper end in the lugs 33 on the back plate 20 and extending downwardly having a hooked end 34 adapted to engage the hook-shaped projection 35 on the upper end of the rack 10.

A crank rod 36 is supported in the lugs 37 on the back plate and the crank end 38 engages the latch arm 32. A crank 39 is arranged on the opposite end of the rod 36 and upon the swinging of this rod the crank end 38 swings the latch arm 32 on its pivot to release the rack and allow the scale to operate.

In order to operate the member 39 a lever 40 is pivotally mounted in the bracket 31 and is provided with a slot 41 intermediate of its length into which the laterally turned end 42 of the crank end 39 extends.

A rigid bracket 43 is secured to the back plate 20 above the bracket 31. The upper end of the lever 40 slides against one arm of said bracket. A cylindrical member 44 is journaled in the bracket 43 and is provided with a long spiral slot 45 which engages a pin secured in the upper end of the lever 40 so that upon the rotation of the cylindrical member the spiral slot will, in engaging the said pin swing the lever on its pivot.

An operating rod 46 extending outwardly from the cylindrical member 44 projects through the front part of the outer casing so that a person desiring to use the scale may reach up and turn the rod.

The movement of the display carrying disk is regulated by an escapement mechanism in the form of a member 47 pivotally mounted upon the front plate 27 and arranged adjacent to the outer face of the spur gear 25. The member 47 is formed with a pair of escapement fingers 48 and 49, the finger 48 being hooked to engage a pin 50 on the spur gear 25 and the other finger being formed with a forked end 51 to engage said pin on the rotation of the gear.

An arm 52 extends downwardly from the escapement member 47 and rests upon a washer 53 secured to the hook 5 of the steelyard and when the scale operates this arm drops downward swinging the finger 48 clear of the pin and allowing the gear 25 to rotate. The forked finger is simultaneously swung into the path of movement of the pin 50 and it engages in the fork and arrests the movement of the gear.

In operating this device, the persons step upon the scale and are consequently brought close to the advertising display which is made in an attractive form and if they desire to ascertain their weight they turn the rod 46 thereby swinging the lever 40 on its pivot and consequently operating the crank 39 and crank rod 36 so that the crank end 38 thereof pushes outwardly against the latch arm 32 thereby disengaging the hooked end of the latch arm from the hooked end of the rack 10. This immediately releases the scale mechanism and the weight of the person pulls downwardly on the steelyard against the springs 7 and the movement of the rack through the pinion 11 and spindle 12 indicates the weight of the person on the scale dial.

When the steelyard moves downwardly the arm of the escapement drops, releasing the pin from the hook finger 48 as described and the spring motor thus released operates the gear 25 and the spur gear 22 carrying the display cards is rotated.

The ratio of the gears 22 and 25 is such that between the point of release of the escapement and the first point of rest the gear 22 and the frame carried thereby travels a quarter revolution. The action is therefore, that immediately the person releases the scale by turning the rod 46 the advertisement appearing in the scale panel will immediately be rotated out of view and another brought before their eyes, thus attracting particular attention by reason of the surprise. When the person steps from the scale the return upward movement of the steelyard engages the arm 52 swinging the escapement member on its pivot so as to release the forked end 49 from engagement with the pin 50 on the gear 25 and the gear travels around until the pin engages the other finger. This results in the display member rotating two further quarter revolutions, thus displaying two other advertisements and when it comes to rest a different display appears and remains from the one initially exhibited when a person steps on the scale.

It will thus be seen that four different advertisements are shown in the scale space when a person is using the scale and when the person leaves it a different one appears from that which appeared when he stepped upon the scale. Each time this occurs and leaves a different one until the cycle is complete. The maximum display of advertising matter is thus effected.

It is necessary that a machine of this character should not require any particular attention in regard to winding and in order to overcome this difficulty the action of releasing the scale is utilized as a winding operation. This is accomplished in a very simple manner by arranging a ratchet wheel 54 on the shaft 30 and a pawl 55 is carried on the lever 40, a lock dog 56 being arranged to hold the ratchet wheel while the pawl 55 moves forward. It will be seen that with each operation of the lever 40 the ratchet wheel will be turned thus effecting a partial winding of the spring motor. The machine thus operates indefinitely without attention.

A device such as described is extremely simple, is very attractive and will not be liable to get out of order and it affords a very large display of advertising matter.

What I claim as my invention is:—

1. In an advertising device, the combination with a scale, of a rotatable display member, means for effecting the rotation of the display member, and means operatively connected with and actuated by the movement of the scale beam for governing and limiting the movement of the rotatable display member operated by the aforesaid means.

2. In an advertising device, the combination with a scale, of a rotatable display member, means separate from the scale mechanism adapted to rotate said display member, and means actuated by the movement of the scale beam for governing and definitely limiting the operation of said rotating means.

3. In an advertising device, the combination with a scale, of a rotatable display member, a motor independent of the scale mechanism adapted to rotate said display member, and an escapement member controlling the movement of said motor operatively connected with the scale mechanism.

4. In an advertising device, the combination with a scale, of a rotatable display member, a motor adapted to rotate said display member, a pivotal escapement member operatively connected with the scale mechanism adapted on the depression of the scale platform to release said motor and to definitely arrest the display member following a predetermined movement thereof and upon the release of the scale beam to again release the motor and regulate a predetermined movement of the display member.

5. In an advertising device, the combination with a scale, of a rotatable display member, a motor adapted to rotate said display member, a train of gears between said motor and said display member, a pin projection arranged on one of said gears, a pivotal escapement member having a pair of fingers to engage said pin, and means connecting said pivotal escapement member with the scale mechanism to release the pin from engagement with one finger on the down movement of the scale and from the other finger on the up movement of the scale.

6. In an advertising device, the combination with the scale beam, weight indicator and the rod connecting same, of a rotatable display member, a motor to operate said display member, a train of gears between said motor and display member, a pin on one of said gears, an escapement member pivotally supported and having a pair of fingers adapted to swing into and out of the path of said pin, and an arm extending from said escapement and engaging the rod operating the weight indicating mechanism.

7. In an advertising device, the combination with a dial scale, of means for locking said scale, a rotatable display member, a spring motor operatively connected to said display member, means for governing the movement of the display member, manually operated means for releasing said locking means, and means operatively connected with said releasing means adapted to wind said spring motor.

8. In an advertising device, the combination with a dial scale, of means for locking said scale, a rotatable display member, a spring motor operatively connected to said display member, means for governing the movement of the display member, a lever operatively connected with said locking means to release same, a shaft geared to said motor, and ratchet means connected with said lever adapted to rotate said winding shaft.

9. In an advertising scale, the combination with a dial scale, of means for locking said scale, a rotatable display member, a spring motor operatively connected to said display member, means for governing the movement of the display member, a lever operatively connected with said locking means to release same, a shaft geared to said motor, ratchet means connected with said lever adapted to rotate said winding shaft, a spirally grooved member arranged adjacent to said lever, and a pin on said lever engaging said spiral groove.

10. In an advertising device, the combination with a dial scale having a rack and pinion indicator device, of a gear rotatably mounted on the axis of the spindle of the indicator, a display frame mounted on said gear, a gear meshing with the aforesaid gear, a spring motor operating said gears, and an escapement device governing the movement of said gears and operatively connected with the pinion operating rack.

RICHARD THOMAS BELL.